July 26, 1927.
C. T. WESTLAKE
BOOSTER MOTOR SUPPORT
Original Filed July 17, 1924
1,636,844
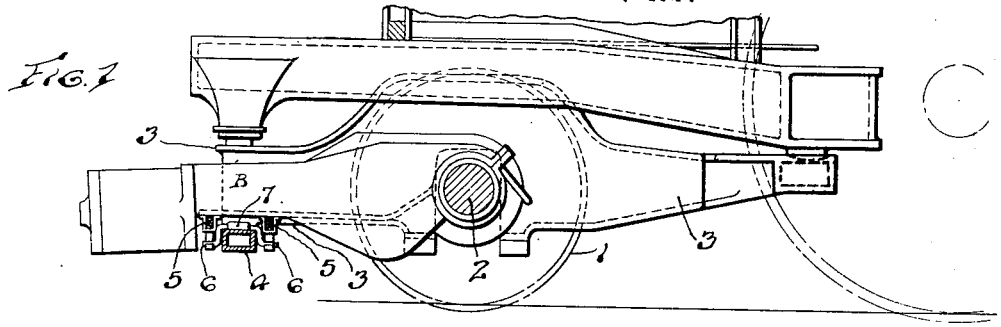
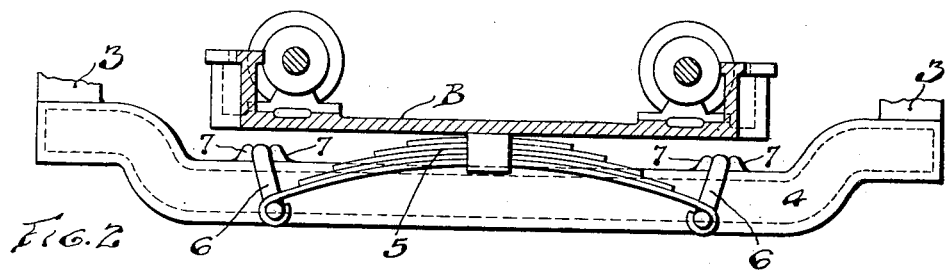
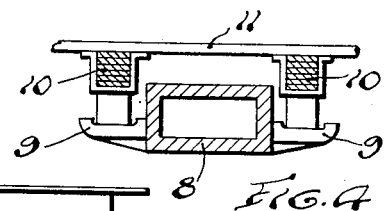
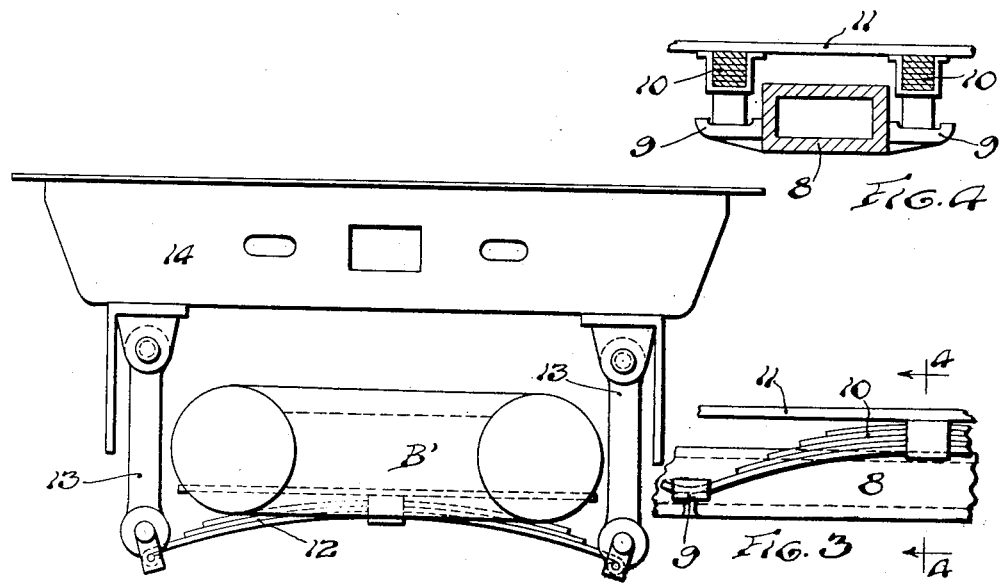
INVENTOR:
Charles T. Westlake, Dec'd,
Lilian A. Westlake, ADMTRX.
BY Cornwall, Bedell & James
ATTYS.

Patented July 26, 1927.

1,636,844

UNITED STATES PATENT OFFICE.

CHARLES T. WESTLAKE, DECEASED, LATE OF ST. LOUIS, MISSOURI; BY LILIAN A. WESTLAKE, ADMINISTRATRIX, OF PALESTINE, TEXAS, ASSIGNOR TO COMMONWEALTH STEEL COMPANY, OF GRANITE CITY, ILLINOIS, A CORPORATION OF NEW JERSEY.

BOOSTER-MOTOR SUPPORT.

Original application filed July 17, 1924, Serial No. 726,553. Divided and this application filed November 10, 1926. Serial No. 147,483.

This invention relates to railway rolling stock and consists in a mounting for booster motors adapted to be operatively connected to locomotive trailer axles.

The present application is a division of the subject-matter described and illustrated in the copending application of said Charles T. Westlake, Serial Number 726,553, filed July 17, 1924.

The main object of the present invention is to provide a yielding support for the rear end of the booster motor in the form of one or more leaf springs disposed transversely of the booster motor and preferably mounted upon the transom of a trailer truck frame, although the spring may be carried by the locomotive frame.

An additional object of the invention is to provide booster motor supporting elements of yielding character which shall be located on the outside of the transom and in part, at least, below the top of the transom.

In attaining these objects, the general object of the above-mentioned application is also attained, namely, the provision of freedom of movement of the rear end of the booster motor to accommodate relative movement between the trailer axle, to which the motor is connected, and the portions of the locomotive or truck which support the rear end of the booster motor.

In the accompanying drawings illustrating the invention,—

Figure 1 is a longitudinal section and view illustrating the application of the invention to a locomotive having a trailer truck equipped with a booster.

Figure 2 is a transverse section through the motor showing the rear view of the transom of the truck illustrated in Figure 1.

Figure 3 is a fragmentary elevation looking in the same direction as Figure 2, but illustrating a modification of the invention.

Figure 4 is a longitudinal section taken on line 4—4 of Figure 3.

Figure 5 is a rear elevation of a booster motor and adjacent portion of the locomotive embodying another modification of the invention.

In the construction shown in Figures 1 and 2, the trailer wheels are indicated at 1 and are mounted upon a trailer axle 2 which may be journaled in the locomotive cradle or, as here illustrated, is journaled in the frame 3 of a trailer truck, which frame includes a rear transom 4. A booster motor, indicated generally by the letter B, is operatively connected to axle 2 and extends rearwardly therefrom and is supported at its rear end by a pair of leaf springs 5 which in turn have their ends mounted upon hangers 6 which straddle transom 4 and are pivoted thereon and are free to swing as may be required when spring 5 is compressed or released and its ends move away from or toward each other. Suitable lugs 7 serve to position hangers 6 on the transom.

The outer ends of springs 5 are located below the top of the transom and the intermediate portions of the springs extend above the top of the transom and support the booster motor along the longitudinal center line of the latter. Either side of the truck frame may move vertically or horizontally relative to the frame of the booster motor without any strains being created in the latter, and hence all such relative movements due to shifting of axle 2 in its box or due to vertical movement of the boxes in the truck frame will be accommodated.

In Figures 3 and 4 I illustrate a modification in which the truck transom member 8 is provided with integral brackets 9 on which the ends of the springs 10 are slidably supported. It will be understood that the remainder of the truck and booster structure is substantially the same as indicated in Figures 1 and 2; the supported portion of the booster bed being indicated at 11.

In Figure 5 another modification of the invention is illustrated in which the booster B' is supported by a leaf spring 12 disposed transversely of the longitudinal center line of the booster and carried at its ends upon links 13 which are pivotally suspended from the rear end 14 of the locomotive bed or cradle. This is a type of support which may be utilized on locomotives which are not equipped with trailer trucks or in which, for other reasons, it may be desirable to support the rear end of the booster from the locomotive frame rather than upon a truck frame.

The modifications illustrated and other variations in the details of the invention may be made without departing from the spirit thereof, and exclusive use of all such changes as come within the scope of the appended claims is contemplated.

What is claimed is:

1. In a locomotive, a trailer axle, a booster motor operatively connected to said axle, and a leaf spring disposed substantially parallel with and spaced from said axle beneath said motor and supporting the latter.

2. In a locomotive, a trailer axle, a booster motor operatively connected to said axle, a leaf spring disposed substantially parallel with and spaced from said axle beneath said motor and supporting the latter, and swinging hangers supporting the ends of said spring.

3. In a locomotive, a trailer truck including an axle and a frame having a rear transom, a leaf spring carried by said transom at spaced points on the latter, and a booster motor supported by said axle and by said spring.

4. In a locomotive, a trailer truck including an axle and a rear transom, a leaf spring supported at spaced points along said transom and extending above the center thereof, and a booster motor connected to said axle and resting on said spring.

5. In a locomotive, a trailer truck including an axle and a rear transom, a leaf spring supported at spaced points along said transom and extending above the center thereof, a booster motor connected to said axle and resting on said spring, and means for permitting movement of the ends of said spring along said transom as the spring is compressed or released.

6. In a trailer truck, a transom, movable spring carrying elements on said transom, a leaf spring with its ends resting on said elements and adapted to support a booster motor between its ends.

7. In a trailer truck, a frame having a transom, supporting elements pivoted to said transom, and yielding means on said elements for carrying a booster motor.

8. In a trailer truck, a frame having a transom, supporting elements pivoted to said transom, a leaf spring with its ends resting on said elements, and a booster motor carried on the intermediate portion of said spring.

9. In a trailer truck, a truck frame having a transom, inverted U-shaped hangers straddling said transom and swinging thereon, out-turned flanges at the lower ends of said hangers, and leaf springs on opposite sides of said transom supported on said hangers.

10. In a trailer truck, a frame having a transom, supporting elements on opposite sides of said transom, and springs on each side of said transom carried on said elements and adapted to support a booster motor.

11. In a trailer truck, a frame having a transom, spaced supporting elements on each side of said transom, and a leaf spring on each side of said transom carried on said elements and adapted to yieldingly support a booster motor.

12. In a trailer truck having a frame with a rear transom, transverse lugs on said transom, and a stirrup hanger straddling said transom and positioned by said lugs and adapted to carry a booster motor supporting spring.

In testimony whereof I hereunto affix my signature this 1st day of November, 1926.

LILIAN A. WESTLAKE,
*Administratrix of the Estate of Charles T. Westlake, Deceased.*